(12) United States Patent
Masubuchi et al.

(10) Patent No.: US 6,397,007 B1
(45) Date of Patent: May 28, 2002

(54) OPTICAL PRINTER

(75) Inventors: Sadao Masubuchi, Tokorozawa; Shigeru Futakami; Chikara Aizawa, both of Nishitokyo, all of (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/762,595
(22) PCT Filed: Jun. 1, 2000
(86) PCT No.: PCT/JP00/03569
  § 371 (c)(1),
  (2), (4) Date: Feb. 9, 2001
(87) PCT Pub. No.: WO00/77573
  PCT Pub. Date: Dec. 21, 2000

(30) Foreign Application Priority Data

Jun. 10, 1999 (JP) ............................................ 11-163496
Jul. 13, 1999 (JP) ............................................ 11-198284

(51) Int. Cl.⁷ ................................................ G03B 17/50
(52) U.S. Cl. ............................. 396/32; 396/36; 355/27; 347/264
(58) Field of Search ............................ 396/30–33, 429; 355/27–29; 347/245, 264

(56) References Cited

FOREIGN PATENT DOCUMENTS

| EP | 1 026 543 A1 | | 8/2000 |
|---|---|---|---|
| JP | 11-8731 A | * | 1/1999 |
| JP | 11-252491 | | 9/1999 |
| JP | 11-344772 | | 12/1999 |
| JP | 11-352595 | | 12/1999 |
| JP | 2000-72302 A | * | 3/2000 |

* cited by examiner

Primary Examiner—D. Rutledge (57) ABSTRACT

A photosensitive element (19) is provided on its photosensitive face side with a non-photosensitive portion with a width D1 extending from a front end to a rear end side in a conveying direction and a non-photosensitive portion with a width D2 extending from the rear end to the front end side. A position of light irradiation of an optical head onto the photosensitive element is set within a range extending a first point at a distance of D1 from the center of the conveying roller (5) on the upstream side in the conveying direction to a second point at a distance of D2 from the center of the conveying roller (5) on the downstream side in the conveying direction.

10 Claims, 7 Drawing Sheets

OPTICAL PRINTER

BACKGROUND OF THE INVENTION

1. Field of the Invention

The present invention relates to an optical printer which converts electrical signal to optical signal to form an image on an instant film.

2. Description of the Prior Art

Figure 9:
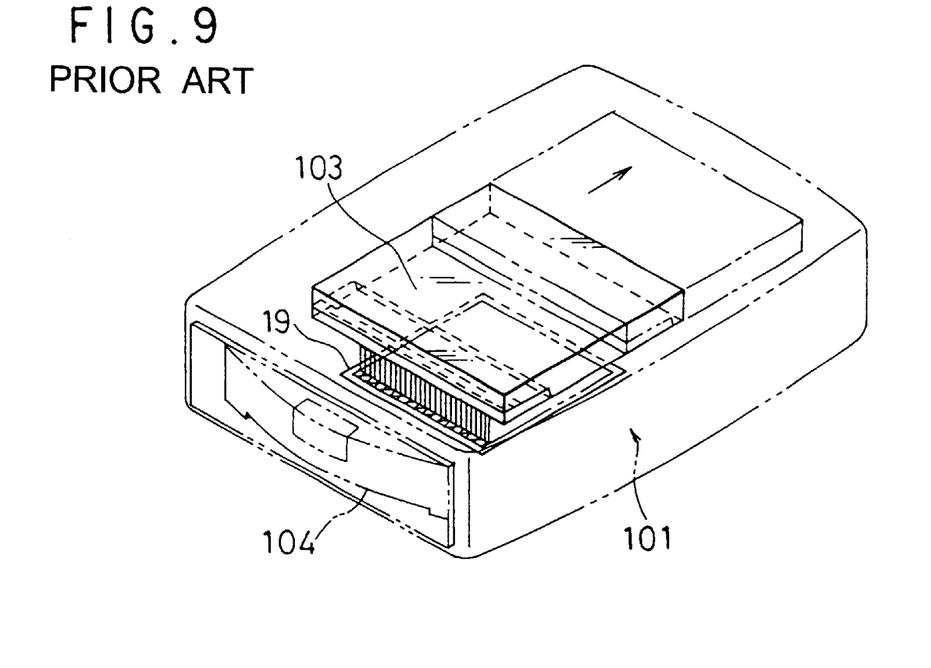
FIG. 9 is an explanatory view showing a state prior to start of a first operation of an optical head in an optical printer according to the conventional art.
Figure 10:
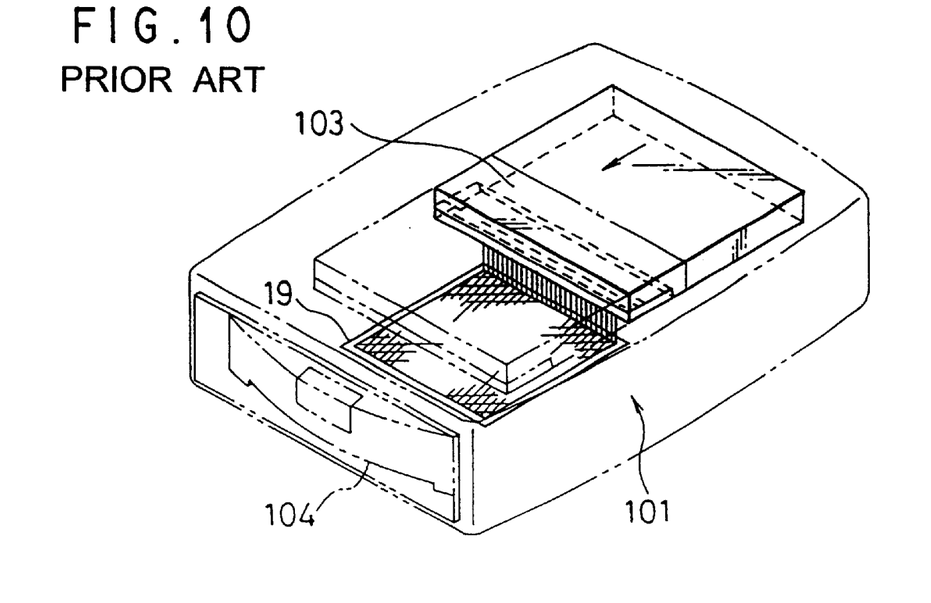
FIG. 10 is an explanatory view showing a state prior to start of a second operation of the optical head shown in FIG. 9 which has completed the first operation.

As shown in FIG. 9 and FIG. 10, in an optical printer of a liquid crystal shutter type, an instant film 19 is fixed on a printer main body 101, an optical head 103 is moved forward/backward relative to the instant film 19, and a photosensitive face of the instant film 19 is exposed by the optical head 103.

Figure 11:
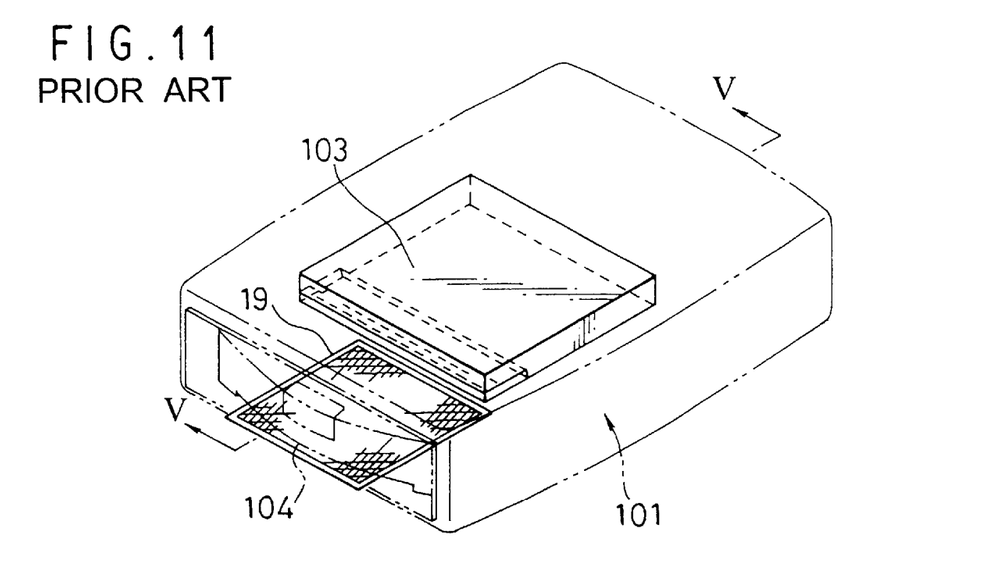
FIG. 11 is an explanatory view showing a state where the optical head shown in FIG. 10 has completed the second operation.

FIG. 9 shows a state of the optical printer before the optical head 103 starts to move rearward (direction of arrow F) in order to expose the photosensitive face of the instant film 19. FIG. 10 shows a state of the optical printer after the rearward movement of the optical head 102 has been completed, namely, the exposure on the photosensitive face of the instant film 19 has been completed. The optical head 103 positioned in the state shown in FIG. 10 moves forward (direction F' opposed to the arrow F shown in FIG. 9) to return back to its original position (position shown in FIG. 9) and stop. Then, as shown in FIG. 11, the instant film 19 is discharged forward from a film discharge port 104.

Figure 12:
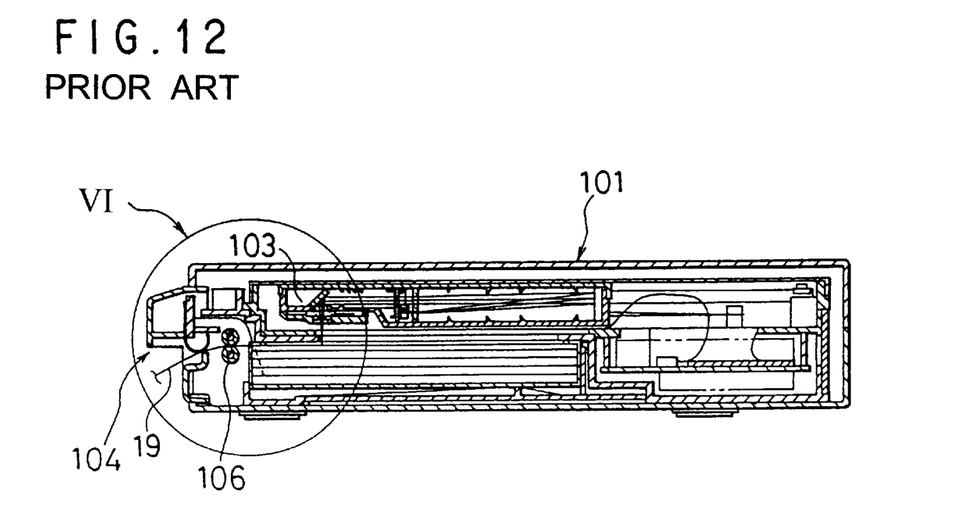
FIG. 12 is a sectional view seen from line V—V in FIG. 11.
Figure 13:
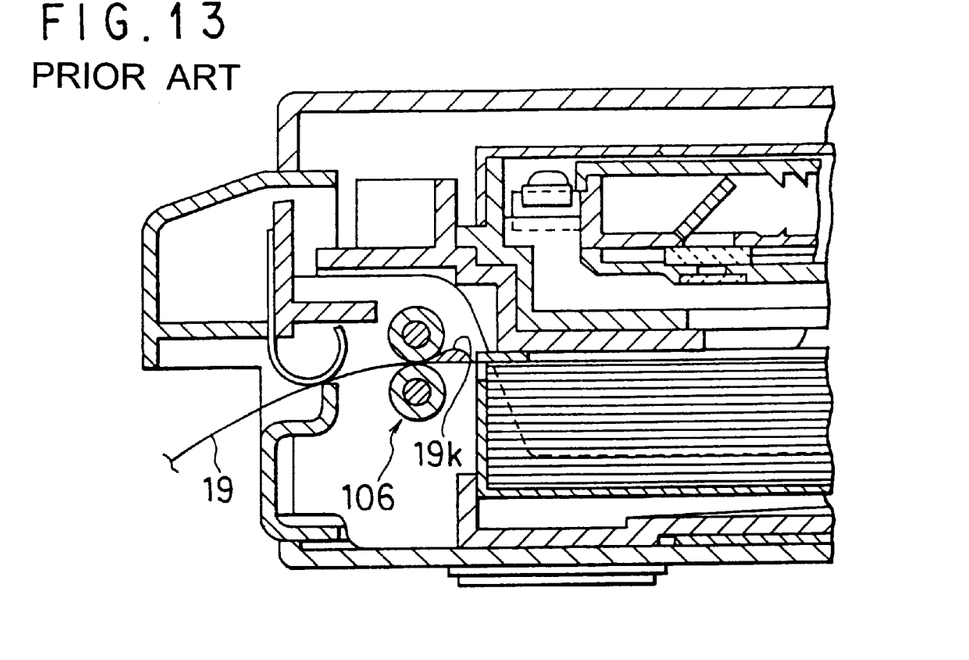
FIG. 13 is an enlarged view of a portion VI in FIG. 12.

A sectional view of this optical printer is shown in FIG. 12, and an enlarged view of a portion H of the sectional view in FIG. 12 is shown in FIG. 13.

Figure 14:
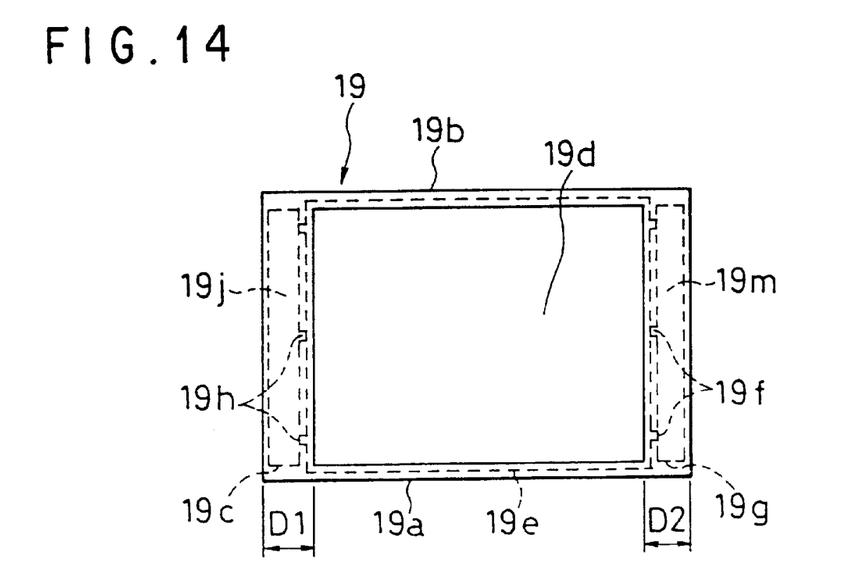
FIG. 14, a film suitable for use in an optical printer.

As shown in FIG. 14, the instant film 19 used in this optical printer has a photosensitive face 19*d* which is an upper surface, and which is surrounded by a front end portion 19*j*, a rear end portion 19*m*, and left and right side end portions 19*a* and 19*b* formed so as to connect the front end portion 19*j* and the rear end portion 19*m*.

A developer accommodating portion 19*c* is formed in the front end portion 19*j* with a width D1 which is a non-photosensitive portion of the instant film 19, and a waste developer accommodating portion 19*g* is formed in the rear end portion 19*m* with a width D2 which is a non-photosensitive portion of the instant film 19. The developer accommodating portion 19*c* accommodates liquid developer. The waste developer accommodating portion 19*g* accommodates waste developer which has been applied for exposure on the photosensitive face 19*d*. Also, a developer retaining bag 19*e* made of transparent material is provided on an upper face of the photosensitive face 19*d*. Developer pouring ports 19*h* are provided between the developer accommodating portion 19*c* and the developer retaining bag 19*e* and developer discharging ports 19*f* are provided between the developer retaining bag 19*e* and the waste developer accommodating portion 19*g* at several portions, respectively.

After the instant film 19 is exposed, the instant film 19 is fed out towards the film discharge port by rotating a pair of developing rollers 106 constituting developing means while nipping the instant film 19 between the pair of developing rollers 106, as shown in FIG. 12 and FIG. 13. In this process, the developer accommodating portion 19*c* is collapsed by the developing rollers 106 so that the liquid developer flows out of the developer accommodating portion 19*c*.

The liquid developer which has flown out of the developer accommodating portion 19*c* enters in the developer retaining bag 19*e* where the developer is applied to the entire photosensitive face 19*d* of the instant film 19, thereby performing developing processing. The liquid developer in the developer retaining bag 19*e* is caused to flow rearward according to rotation of the developing rollers 106 to flow in the waste developer accommodating portion 19*g* through the developer discharging ports 19*f*. At this time, the developer retaining bag 19*e* is expanded largely on its rear side of the developing rollers 106 due to fluid resistance generated by flowing of the liquid developer into the liquid discharging ports 19*f*, as shown with reference numeral 19*k* in FIG. 13.

When the portion of the developer retaining bag 19*e* which has been expanded by the liquid developer passes through the nip between the developing rollers 106, it acts as an obstacle so that the conveying speed of the instant film 19 by the developing rollers 106 is reduced at this time. As a result, since the conveying speed of the instant film 19 becomes unstable to change, exposure unevenness occurs on the instant film 19.

OBJECT AND SUMMARY OF THE INVENTION

An object of the present invention is to suppress load variation to the instant film at a time when the exposed instant film is discharged while developing the instant film to maintain the discharging speed of the instant film constant, in the optical printer, thereby suppressing exposure unevenness on the instant film 19.

An optical printer according to the present invention comprises an accommodating portion for accommodating a photosensitive element, a conveying roller for conveying the photosensitive element from the accommodating portion along a predetermined conveying path, and an optical head for irradiating light on a predetermined position on the photosensitive element, wherein an image is formed on the photosensitive element. Then, the photosensitive element is provided on its photosensitive face side with a non-photosensitive portion with a first predetermined width (D1) extending toward a rear end from an front end in a conveying direction of the photosensitive element and a non-photosensitive portion with a second predetermined width (D2) extending toward the front end from the rear end. A position of a light irradiation on the photosensitive element by the optical head is set within a range from a first point at a distance equal to the first predetermined width (D1) from a center of the conveying roller on the upstream side in the conveying direction and a second point at a distance equal to the second predetermined width (D2) from the center of the conveying roller on the downstream side in the conveying direction.

The optical printer according to the present invention can take the following aspects.

The position of irradiation region is set on the downstream side or the upstream side of the conveying direction with respect to the center of the conveying roller, or it is caused to coincide with an approximate center of the conveying roller in the conveying direction.

The photosensitive element has non-photosensitive portions on both side end portions positioned between the front end side non-photosensitive portion and the rear end side non-photosensitive portion on the side of photosensitive face. The conveying roller is brought in contact with regions corresponding to the non-photosensitive portions on the both side end portions of the photosensitive element to convey the conveying roller.

The conveying roller is rotationally driven at a predetermined rotational speed by driving means and is disposed in opposition to an follower roller with a predetermined pressure relative thereto.

The photosensitive element is an instant film in which liquid developer is accommodated and which can perform self-developing processing. A developing roller is provided for applying the liquid developer to the photosensitive face. The conveying roller and the developing roller are driven by one motor. The conveying roller has a conveying roller driving gear formed coaxially to the rotational shaft of the conveying roller, the developing roller has a developing roller driving gear formed coaxially to the rotational shaft of the developing roller, and both the conveying roller driving gear and the developing roller driving gear are brought to mesh with one intermediate gear to be driven by the one motor.

BRIEF DESCRIPTION OF THE DRAWINGS

FIG. 6 is a partially enlarged view in FIG. 1. Incidentally, FIG. 6 shows a state where an instant film is discharged while it is being printed;

DETAILED DESCRIPTION OF THE PREFERRED EMBODIMENTS

Figure 1:
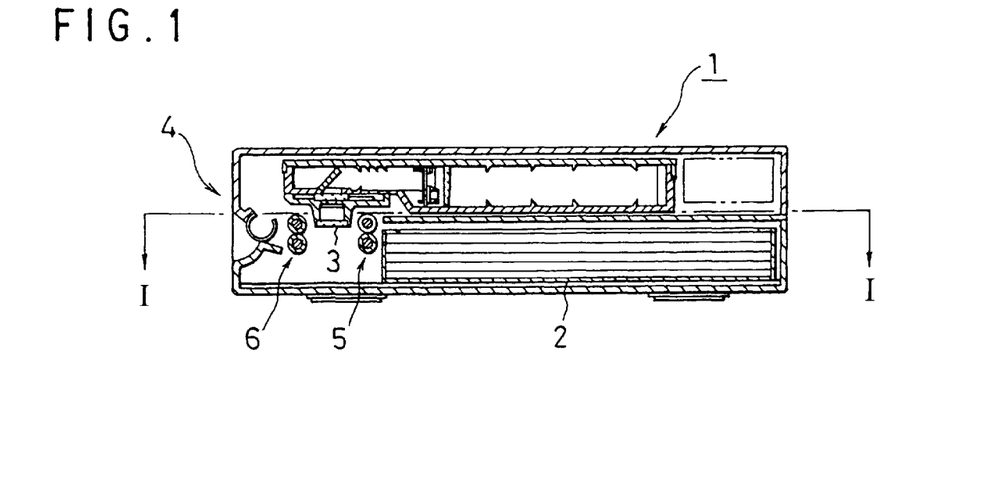
FIG. 1 is a sectional view of an optical printer according to a first embodiment of the present invention.

As shown in FIG. 1, provided in a printer main body 1 of an optical printer are a film accommodating portion 2 for accommodating an instant film and an optical head 3 for exposing a photosensitive face of the instant film to print an image. Also, provided at a front face of the printer main body 1 is a film discharging port 4 for discharging the printed instant film.

Figure 2:
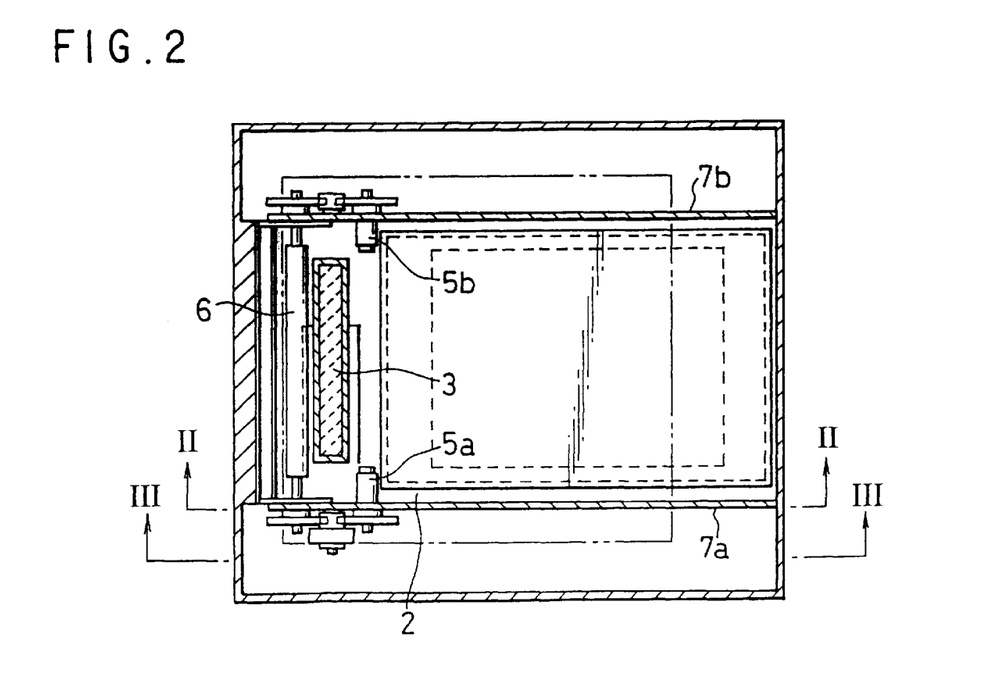
FIG. 2 is a sectional view seen from line I—I in FIG. 1.

Furthermore, two pairs of conveying rollers 5 and a pair of developing rollers 6 are disposed between the film accommodating portion 2 and the film discharging port 4 within the printer main body 1, as shown in FIG. 2. The instant film used in this optical printer is the same as the conventional one which has been explained with reference to FIG. 14.

Figure 3:
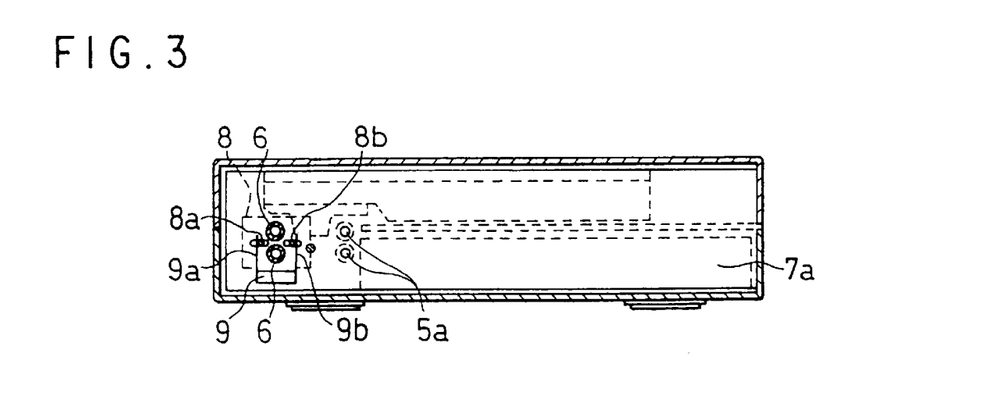
FIG. 3 is a sectional view seen from line II—II in FIG. 2.

Next, the conveying rollers 5 will be explained. These conveying rollers 5 are conveying means for conveying the instant film 19 accommodated in the film accommodating portion 2 towards the film discharging port 4, and, as shown in FIG. 2 and 3, they are constituted by a left roller pair 5a comprising an upper roller and a lower roller which are rotatably supported to a left frame body 7a of the printer main body 1 in a cantilever manner and a right roller pair 5b comprising an upper roller and a lower roller which are rotatably supported to a right frame body 7b in a cantilever manner.

As shown in FIG. 2 and FIG. 14, the upper and lower rollers constituting the left roller pair 5a and the right roller pair 5b of the conveying rollers 5 have lengths corresponding to the widths of the left and right side end portions 19a, 19b on the instant film 19, respectively. That is, the instant film 19 is nipped at its left side end portion 19a and right side end portion 19b by the left roller pair 5a and the right roller pair 5b constituting the conveying rollers 5 to be fed out forward.

Next, the developing rollers 6 will be explained. The developing rollers 6 are constituted by rollers (upper roller and lower roller) which are respectively provided to upper and lower two rotational shafts rotatably extending from the left frame body 7a to the right frame body 7b. Incidentally, the developing rollers 6 are mounted to these frame body 7a and frame body 7b so as to be movable in the conveying direction of the instant film 19 and in the direction opposed thereto. The structure will be explained below with reference to FIG. 3.

Guide grooves extending in front and rear directions in a narrow manner are formed at respective front portions on the left frame body 7a and the right frame body 7b of the printer main body 1. Furthermore, plate-shaped supporting frames 8 are respectively brought in contact with insides of the left frame body 7a and the right frame body 7b at positions where the guide grooves are blocked.

Guide pins 8a and 8b project outward perpendicularly to a face of the supporting frame 8 from a front portion and a rear portion of the supporting frame 8. The guide pins 8a and 8b projecting outward are engaged with the guide grooves of the left frame body 7a and the right frame body 7b. Accordingly, the left side supporting frame 8 and the right side supporting frame 8 can be slid in front and rear directions (without rotation) relative to the left frame body 7a and the right frame body 7b, respectively.

Furthermore, a pair of roller bearings (not shown) for supporting left end portions of the upper roller and the lower roller constituting the developing rollers 6 are provided in the left supporting frame 8 along a vertical direction. Also, a pair of roller bearings (not shown) for supporting right end portions of the upper roller and the lower roller constituting the developing rollers 6 are provided in the right supporting frame 8 along a vertical direction.

Accordingly, in a state where the respective left and right end portions of the upper roller and the lower roller constituting the developing rollers 6 are fitted into the above roller bearings of the left and right supporting frames 8, the developing rollers 6 can be moved forward or rearward relative to the left and the right frame bodies 7a and 7b.

Furthermore, developing roller resilient retaining members 9 are respectively fixed to the left and right frame bodied 7a and 7b. The member 9 comprises a first urging portion 9a which urges the developing roller 6 in a direction opposed to the conveying direction of the instant film 19 and a second urging portion 9b which urges the developing roller 6 in the conveying direction of the instant film 19. The first urging portion 9a and the second urging portion 9b sandwiches the developing roller 6 at a center in a movable range of the developing roller 6.

Next, rotational drive of the conveying rollers 5 and the developing rollers 6 will be explained with reference to FIG. 4 and FIG. 5.

A first gear 5c is fixed to the rotational shaft of the upper roller constituting the left roller pair 5a of the conveying rollers 5. Also, a second gear 6c is fixed to a left end portion of the rotational shaft of the upper roller constituting the developing rollers 6. Furthermore, a third gear 10 meshing with the first gear 5c and the second gear 6c is arranged between both the gears. This third gear 10 meshes with a motor gear 11a fixed to an output shaft of a motor 11. Accordingly, when the motor 11 is rotated, the conveying rollers 5 and the developing rollers 6 are synchronously rotated in the same direction.

A fourth gear 5d is fixed to the rotational shaft of the upper roller constituting the right roller pair 5b of the conveying roller 5. Also, a fifth gear 6d is fixed to the right end portion of the rotational shaft of the upper roller constituting the developing rollers 6. Furthermore, a sixth gear 11 meshing with the fourth gear 5d and the fifth gear 6d is arranged between the both gears.

Figure 4:
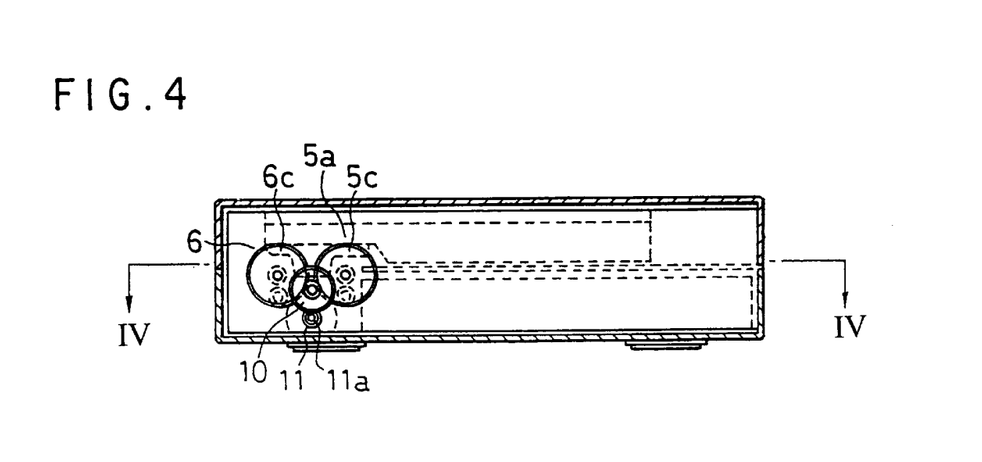
FIG. 4 is a sectional view seen from line III—III in FIG. 2.
Figure 5:
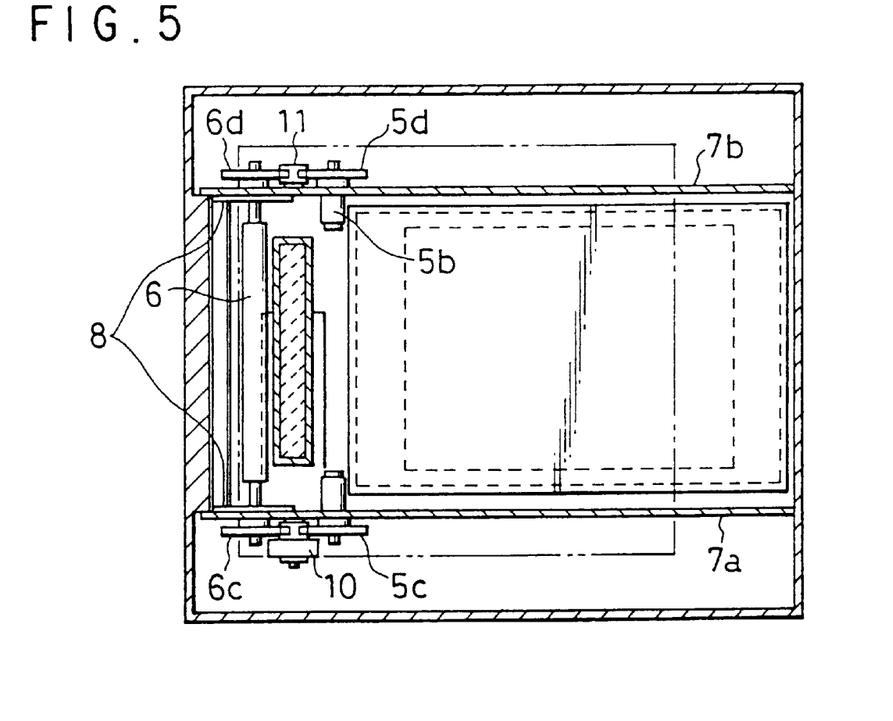
FIG. 5 is a sectional view seen from line IV—IV in FIG. 4.

Incidentally, in FIG. 4 and FIG. 5, as mentioned above, the first gear 5c is fixed to the rotational shaft of the upper roller constituting the left roller pair 5a of the conveying rollers 5, the fourth gear 5d is fixed to the rotational shaft of the upper roller constituting the right roller pair 5b, and the second and fourth gears are respectively fixed to the left and right end portions of the rotational shaft of the upper roller constituting the developing rollers 6. Instead of this structure, such a structure may be employed that the first gear 5c is fixed to the rotational shaft of the lower roller constituting the left roller pair 5a of the conveying rollers 5, the fourth gear 5d is fixed to the rotational shaft of the lower roller constituting the right roller pair 5b, and the second and fourth gears are respectively fixed to the left and right end portions of the rotational shaft of the lower roller constituting the developing rollers 6.

Next, an aspect for conveying the instant film towards the film discharging port 4 by the conveying rollers 5 will be explained with reference to FIG. 4 to FIG. 7.

When the motor 11 is driven, the respective upper rollers of the left roller pair 5a and the right roller pair 5b constituting the conveying rollers 5 are synchronously rotated. Since the left side end portion 19a of the instant film 19 and the right side end portion 19b thereof are respectively nipped by the upper roller and the lower roller constituting the left roller pair 5a of the conveying rollers 5 and by the upper roller and the lower roller constituting the right roller pair 5b of the conveying rollers 5, the instant film 19 is fed out forward by synchronous rotation of the left roller pair 5a and the right roller pair 5b.

The instant film 19 fed out forward by the conveying rollers 5 is further nipped by the upper roller and the lower roller constituting the developing rollers 6. During this process, the developer accommodating portion 19c is collapsed and broken by the developing rollers 6. As a result, the liquid developer flows out from the developer accommodating portion 19c on to the photosensitive face 19d.

The liquid developer which has flown out from the developer accommodating portion 19c enters in the developer retaining bag 19e to wet the entire of the photosensitive face 19d of the instant film 19, so that developing processing is performed. The liquid developer in the developer retaining bag 19e is caused to flow rearward according to rotation of the developing rollers 5 to flow in the waste developer accommodating portion 19g through the developer discharging ports 19f. At this time, a portion of the developer retaining bag 19e which is positioned rearward of the developing rollers 6 is expanded by the inside liquid developer, as shown with reference numeral 19k in FIG. 6.

Figure 6:
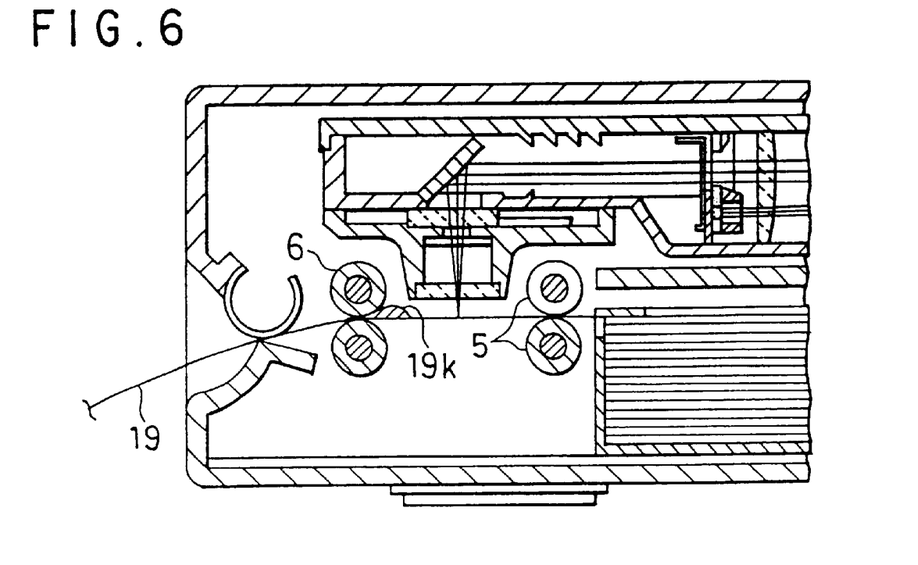

The portion of the developer retaining bag 19e which has been expanded by this liquid developer acts as an obstacle when the portion passes through between the upper roller and the lower roller constituting the developing rollers 6 so that conveyance resistance occurs. However, even when such conveyance resistance acts on the developing rollers 6, the first urging portion 9a constituting the developing roller resilient retaining member 9 is flexed so that the developing rollers 5 slightly move forward relative to the left and right fame bodies 7a and 7b to go away from the conveying rollers 5. After the portion of the developer retaining bag 19g which has been expanded by this liquid developer passes through the developing rollers, the conveyance resistance lowers, so that the developing rollers 6 are returned back to their original positions by action of the second urging portion 9b.

As mentioned above, since the developing rollers 6 are structured so as to be movable in forward and rearward directions by a slight distance relative to the left and right frame bodies 7a and 7b, when the portion of the developer retaining bag 19e which has been expanded by this liquid developer passes through between the upper roller and the lower roller constituting the developing rollers 6, the developing rollers 6 are moved away from the conveying rollers so that the distance between the developing rollers 6 and the conveying rollers 5 are increased. As a result, the conveying speed of the instant film 19 is prevented from lowering temporarily so that a constant conveying speed of the instant film 19 can always be achieved and occurrence of exposure unevenness can be suppressed on the photosensitive face 19d of the instant film 19.

As mentioned above, the present invention is different from the optical printer which belongs to the conventional art shown in FIG. 9 to FIG. 13 in that the conveyance of the instant film 1 is performed exclusively by rotation of the conveying rollers 5 provided upstream of the developing rollers 6 and that the optical head 3 is arranged at a fixed position to the printer main body 1 without moving the optical head 3 forward and rearward.

The developing rollers 6 and pickup means (not shown) for drawing the instant film 19 from the film accommodating portion 2 take part in conveyance of the instant film 19 besides the rotation of the conveying rollers 5. However, among the means taking part in conveyance of the instant film 19, only the conveying rollers 5 are provided with a function for conveying the instant film 19 at an accurately constant speed.

When the developer retaining bag 19e is expanded by the liquid developer inside the bag, as shown with reference numeral 19k in FIG. 6, the advancing speed of the instant film 19 lowers at a time when the instant film 19 passes through the developing rollers 6. However, an influence of lowering of the advancing speed at that portion is not transmitted to the portion of the instant film which has been nipped between the conveying rollers 5 and which is positioned upstream the developing rollers 6 and a peripheral region of the portion and is absorbed during the transmission.

Accordingly, when the photosensitive face 19d of the instant film 19 is opposed to the light irradiation positions 2u and 2d, the instant film 19 must be put in a state where it is being conveyed by the conveying rollers 5.

Figure 7:
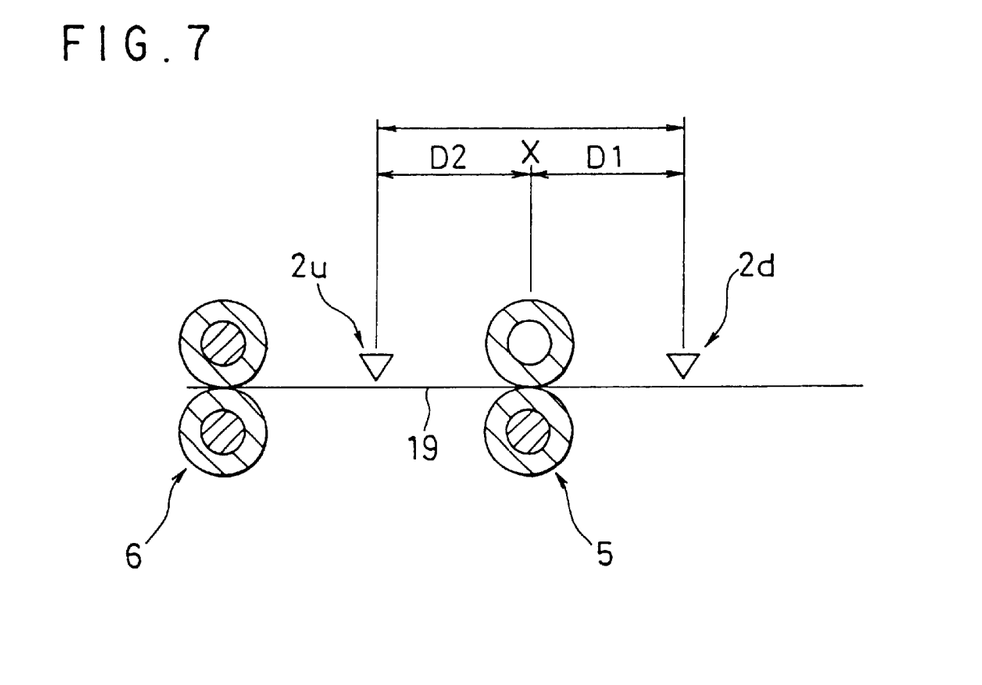
FIG. 7 is an explanatory diagram showing a range of a light irradiation position where an optical head exposes an instant film, with respect to a conveying roller feeding the instant film.

In particular, as shown in FIG. 7, light irradiation position of the optical head 3 onto the photosensitive face 19d of the instant film 19 is set within a range from a first point at a distance D1 (this distance is equal to the width D1 of the front end portion 19j which is the non-photosensitive portion of the instant film 19 (FIG. 14)) from the center X of the conveying rollers 5 on the upstream side in the conveying direction to a second point at a distance D2 (this distance is equal to the width D2 of the front end portion 19m which is the non-photosensitive portion of the instant film 19 (FIG. 14)) from the center X of the conveying rollers 5 on the downstream side in the conveying direction.

For this reason, when the instant film 10 is conveyed and the light irradiation position reaches the photosensitive face 19d so that light writing is performed by the optical head 3, a front end of the instant film 19 has already been securely griped by the conveying rollers 5 and the instant film 19 is conveyed in a constant speed, so that an even image can be obtained.

Also, since the rear end of the instant film 19 is continued to be gripped by the conveying rollers 5 until the light irradiation position of the optical head 3 reaches the rear end portion 19m and light writing is completely terminated, the photosensitive face 19d can be exposed up to its trailing portion under the constant speed.

In FIG. 1 and FIG. 6 which is a partial enlarged view of FIG. 1, the optical head 3 is arranged in an intermediate portion between the conveying rollers 5 and the developing rollers 6 and above them. Therefore, this optical head 3 irradiates a portion of the instant film 19 which is advanced in an upstream direction by a distance of the distance D2 or less from a portion X of the instant film 19 which is nipped at the left and right side portions 19a and 19b by the left and right roller pairs 5a and 5b constituting the conveying rollers 5 to be fed out.

Figure 8:
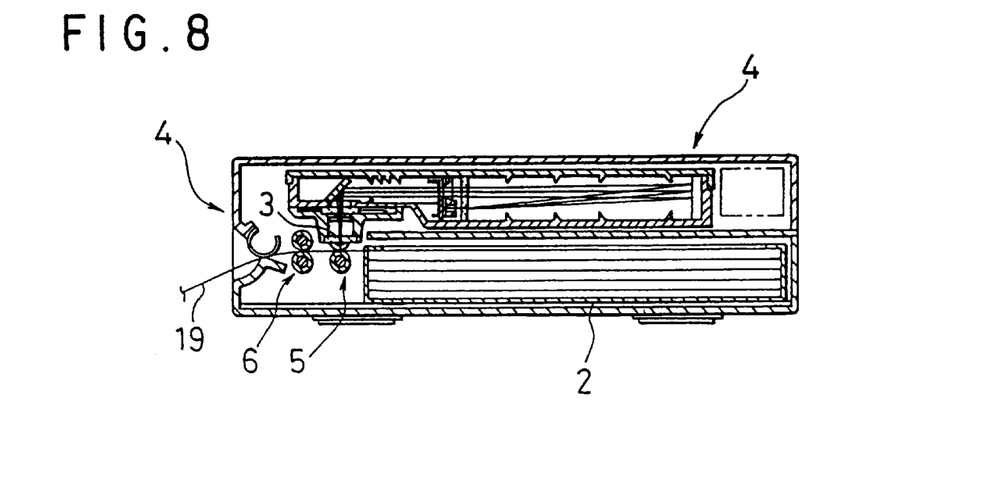
FIG. 8 is a sectional view of an optical printer according to a second embodiment of the present invention.

Meanwhile, as shown in FIG. 8, when the optical head 3 is arranged approximately above the common central axis of the left and right roller pairs 5a and 5b of the conveying rollers 5, the optical head 3 irradiates a portion (portion indicated by X in FIG. 7) of the instant film 19 which is gripped at the left and right side end portions 19a and 19b by the left and right roller pairs 5a and 5b constituting the conveying rollers 5 to be fed out.

What is claimed is:

1. An optical printer which comprises an accommodating portion in which a photosensitive element is accommodated, a conveying roller which conveys the photosensitive element from the accommodating portion along a predetermined conveying path, and an optical head which irradiates light on a predetermined position on the photosensitive element, and which forms an image on the photosensitive element, wherein the photosensitive element is provided on the side of a photosensitive face with a non-photosensitive portion with a first predetermined width extending from a front end to a rear end side and a non-photosensitive portion with a second predetermined width extending from the rear end to the front end side in a conveying direction, and a position of irradiation region by light from the optical head onto the photosensitive element is set within a range from a first point at a distance equal to the first predetermined width from the center of the conveying roller on the upstream side in the conveying direction to a second point at a distance equal to the second predetermined width from the center of the conveying roller on the downstream side in the conveying direction.

2. An optical printer according to claim 1, wherein the position of light irradiation region is set to the downstream side from the center of the conveying roller along the conveying direction.

3. An optical printer according to claim 1, wherein the position of light irradiation region is set to the downstream side from the center of the conveying roller along the conveying direction.

4. An optical printer according to claim 1, wherein the position of light irradiation region approximately corresponds to the center of the conveying roller.

5. An optical printer according to claim 1, wherein the photosensitive element has non-photosensitive portions on both side end portions between the non-photosensitive portion on the front end side and the non-photosensitive portion on the rear end side on the photosensitive face side, and the conveying roller comes in contact with regions corresponding to the non-photosensitive portions of the both side end portions of the photosensitive element to convey the photosensitive element.

6. An optical printer according to claim 5, wherein the conveying roller is rotationally driven at a predetermined rotational speed by driving means, and is arranged so as to be opposed to an follower roller with a predetermined pressure applied to the follower roller.

7. An optical printer according to claim 1, wherein the photosensitive element is an instant film in which liquid developer is accommodated and which can perform self-developing processing.

8. An optical printer according to claim 7, comprising a developing roller for applying the liquid developer to the photosensitive face.

9. An optical printer according to claim 8, wherein the conveying roller and the developing roller are driven by one motor.

10. An optical printer according to claim 8, wherein the conveying roller has a conveying roller driving gear formed coaxially to a rotational shaft of the conveying roller, the developing roller has a developing roller driving gear formed coaxially to a rotational shaft of the developing roller, and the conveying roller driving gear and the developing roller driving gear mesh with one intermediate gear so that the conveying roller driving gear and the developing roller driving gear are driven by one motor.

* * * * *

UNITED STATES PATENT AND TRADEMARK OFFICE
CERTIFICATE OF CORRECTION

PATENT NO.     : 6,397,007 B1
DATED          : May 28, 2002
INVENTOR(S)    : Sadao Masubuchi et al.

It is certified that error appears in the above-identified patent and that said Letters Patent is hereby corrected as shown below:

<u>Column 8,</u>
Lines 18-21, claim 3 should read as follows:
    3. An optical printer according to claim 1, wherein the position of light irradiation region is set to the upstream side from the center of the conveying roller along the conveying direction.

Signed and Sealed this

Second Day of September, 2003

JAMES E. ROGAN
*Director of the United States Patent and Trademark Office*